(12) United States Patent
Horel et al.

(10) Patent No.: US 7,412,411 B2
(45) Date of Patent: Aug. 12, 2008

(54) METHODS AND APPARATUS FOR GIFTING OVER A DATA NETWORK

(76) Inventors: Gerald Charles Horel, 6500 Torin Road, Brentwood Bay, B.C. (CA) V8M 2H5; Brian Minear, 7516 Collins Ranch Ter., San Diego, CA (US) 92130; Phil Tien Nguyen, 12676 Via Colmenar, San Diego, CA (US) 92129

( * ) Notice: Subject to any disclaimer, the term of this patent is extended or adjusted under 35 U.S.C. 154(b) by 627 days.

(21) Appl. No.: 10/832,717

(22) Filed: Apr. 26, 2004

(65) Prior Publication Data
US 2005/0261988 A1 Nov. 24, 2005

(51) Int. Cl.
*G06Q 30/00* (2006.01)
(52) U.S. Cl. .......................................... 705/27; 705/26
(58) Field of Classification Search ................... 705/26, 705/27
See application file for complete search history.

(56) References Cited

U.S. PATENT DOCUMENTS

| | | | | |
|---|---|---|---|---|
| 5,426,594 | A * | 6/1995 | Wright et al. ............... | 709/206 |
| 5,870,718 | A * | 2/1999 | Spector ....................... | 705/26 |
| 6,175,823 | B1 * | 1/2001 | Van Dusen ................... | 705/26 |
| 6,343,316 | B1 * | 1/2002 | Sakata ......................... | 709/213 |
| 7,239,877 | B2 * | 7/2007 | Corneille et al. ........... | 455/456.3 |
| 2001/0032093 | A1 * | 10/2001 | Segal ............................. | 705/1 |
| 2002/0006117 | A1 * | 1/2002 | Duske et al. ................. | 370/316 |
| 2003/0050815 | A1 * | 3/2003 | Seigel et al. ................... | 705/7 |
| 2003/0074265 | A1 | 4/2003 | Oshima | |
| 2003/0074266 | A1 * | 4/2003 | Lorber ......................... | 705/26 |
| 2003/0154135 | A1 * | 8/2003 | Covington et al. ............ | 705/26 |
| 2004/0006499 | A1 | 1/2004 | Vergopoulos | |
| 2004/0068532 | A1 * | 4/2004 | Dewing et al. ............... | 709/200 |
| 2004/0260973 | A1 * | 12/2004 | Michelman .................. | 714/13 |
| 2005/0004837 | A1 * | 1/2005 | Sweeney et al. .............. | 705/14 |
| 2005/0119947 | A1 * | 6/2005 | Lin ............................... | 705/27 |
| 2005/0165641 | A1 * | 7/2005 | Chu et al. .................... | 705/14 |

FOREIGN PATENT DOCUMENTS

JP 2001272986 A * 10/2001

OTHER PUBLICATIONS

Anon, "The Software Catalog: Microcomputers, Summer 1985," Administrative Management, vol. 46, p. 74, Oct. 1985.*
Anon., "PRTV Video Alert," PR Newswire, Dec. 13, 1988.*
Anon., "Pinpoint Introducers FuelShop Mobile Content Storefront Solution; Creating New Mobile Revenue Opportunities with Comprehensive, Low-Cost Offering," Business Wire, Dec. 2, 2003.*

(Continued)

*Primary Examiner*—Nicholas D. Rosen

(57) ABSTRACT

A method is provided for operating a server to allow a first terminal to provide a content gift to a second terminal, where the first and second terminals selectively communicate with the server. The method includes receiving a catalog request from the first terminal for a catalog that identifies content compatible with the second terminal. The method also includes generating the catalog and transmitting the catalog to the first terminal. The method also includes receiving a gift request from the first terminal requesting that a content gift selected from the identified content in the catalog be provided to the second terminal, and providing the content gift to the second terminal.

66 Claims, 7 Drawing Sheets

OTHER PUBLICATIONS www.evite.com, as of Dec. 23, 2003.*

Anon., "InphoMatch Gets $13.5m; Creates Mobile Content Unit," Online Reporter, Mar. 20, 2004.*

Anon., Crosstalk for Windows 1.1., PC Sources, vol. 2, No. 5, p. 420, May, 1991.*

Microsoft Press Computer Dictionary, Third Edition, Microsoft Press, Redmond 1997, pp. 150 and 441.

Anon, "Pinpoint Introduces FactShop Mobile Content Storefront Solution: Creating New Mobile Revenue Opportunites with Comprehensive Low Cost Offering," Business Wire, Dec. 2, 2003 espcially paragraph beginning Customers can create:.

Anon, "PRATV Video Alert," PR Newswire, Dec. 13, 1988, especially first paragraph.

Anon, "The Software Catalog: Microcomputers Summer 1986," Administrative Management, vol. 46, p. 74, Oct. 1985, whole article.

http:www.evite.com as of Dec. 23, 2003.

Record Display Form—Pub-No: JP02001272986A Document Identifier.

http://web.archive.org/web/20030218043917/http://www.tomorrows-hope.com/cards/thanks.html Thanksgiving E-Cards.

* cited by examiner

METHODS AND APPARATUS FOR GIFTING OVER A DATA NETWORK

FIELD

The present invention relates generally to the operation of data networks, and more particularly, to methods and apparatus for providing a content gift in a data network.

DESCRIPTION OF THE RELATED ART

Advances in technology have resulted in the development and deployment of extensive data networks. These networks include both public data networks, such as the Internet, and specialized networks, such as wireless telecommunication networks. Users of these networks have the ability to access a wide variety of information and services that are available as network resources.

One area where data networks have become especially useful is in the area of downloadable content. Typically this content includes executables, program files, applications, image or multimedia files, data, meta-data, or any other type of file or content that provides information or additional functionality to a device. For example, a downloadable application may provide the device user with a real-time display of information such as news or traffic conditions, provide productivity functions, such as a personal organizer, or provide entertainment through various online or offline games.

There currently exists an increasing demand for downloadable content in wireless network environments. In a wireless environment, a variety of wireless devices, such as wireless telephones and personal digital assistants (PDAs), communicate over a wireless network. The wireless network includes network servers that operate to provide various network services and resources to the devices. Furthermore, the wireless network may also be coupled to a public network (i.e., the Internet), so that servers on the public network can also provided services to the wireless devices.

Typically, a wireless device downloads content over the air from a network server. For example, the content may be an application that is downloaded for free or purchased by the user of the wireless device, who effectively obtains the rights to use the application for an unlimited, fixed, or usage count based expiration period.

It has become increasingly desirable to allow a content gift to be given to a specific network terminal. For example, a user of a first network terminal may wish to give a content gift to the user of a second network terminal. The content gift comprises any type of file, data, or information that can be downloaded and used on the second network terminal. Typically, the user of the first terminal assumes any costs associated with the content gift. For example, the content gift may be a downloadable application that the first user finds to be especially useful or productive, or the content gift may simply be content that the second user would like to have.

Unfortunately, current systems operate so that when a gift-giver gives a content gift, it is done without knowing whether or not the content gift is compatible with the gift-receiving terminal. For example, an application may operate properly on the gift-giver's terminal, however, that same application may not operate properly on the gift-receiving terminal because of hardware or software incompatibilities. Furthermore, the user of the gift-receiving terminal may have previously purchased the same application, so that a duplication of the application on the gift-receiving terminal results. Thus, the gift-giver has no way of knowing what content is compatible with the gift-receiving terminal, or what content has already been purchased for use on that terminal.

Therefore, what is needed is a system that allows a content gift to be given to a gift-receiving terminal in a data network, where the content gift is known to be compatible with the gift-receiving terminal. The system should also allow a gift-giver to determine in advance whether or not the intended content gift currently exists on the gift-receiving terminal. As a result, such a system would avoid the compatibility problems and potential duplicate purchases associated with current systems.

SUMMARY OF THE INVENTION

In one or more embodiments, a gifting system comprising methods and apparatus is provided to allow a content gift to be given to a gift-receiving terminal in a data network. In one embodiment, a gift-giver selects the content gift from a catalog that comprises a list of content that is known to be compatible with the gift-receiving terminal. The catalog may also describe content that currently exists on the gift-receiving terminal, so that duplication can be avoided.

In one embodiment, the gift-giver requests the catalog from a server (or gift-server) operating on a data network. The request includes an identifier that identifies the gift-receiving terminal. For example, if the gift-receiving terminal is a wireless telephone, the gift-giver specifies the telephone number of the gift-receiving terminal in a request for a catalog of compatible content that is sent to the gift-server. Due to security and privacy concerns, additional security codes may be required in the catalog request. The gift-server responds to the request by compiling and transmitting to the gift-giver a description of content that is compatible with the gift-receiving terminal. The gift-giver then selects one or more content items from the catalog as content gifts to be provided to the gift-receiving terminal. Because the content gift is selected from a list of content known to be compatible with the gift-receiving terminal, the system operates to extend the view of the gift-giver to see what would work on another user's terminal. Thus, terminal compatibility and content duplication problems are resolved up front before the gift is given.

In one or more embodiments, the gift-giver may give a content gift using any one of several methods. For example, the gift-giver may operate a terminal similar to the gift-receiving terminal on the same data network. In another embodiment, the gift-giver may provide the content gift using other means to access the gift-server associated with the gift-receiver. For example, the gift-giver may use a Web page associated with the gift-server to view the catalog and select a content gift. Thus, the content gift may originate from a wired or wireless device, a fixed computer device, such as a personal computer, or any other device having access to the gift-server associated with the gift-receiving terminal.

In one embodiment, the gifting system allows for targeted content to appear in the catalog. For example, the gift-receiver may be a member of a financial organization and the gift-server compiles the catalog to include compatible content targeted for that organization. Thus, the gift-giver can select a content gift from the targeted information that is compatible with the gift-receiving terminal.

In one embodiment, a method is provided for operating a server to allow a first terminal to provide a content gift to a second terminal, where the first and second terminals selectively communicate with the server. The method comprises receiving a catalog request from the first terminal for a catalog that identifies content compatible with the second terminal. The method also comprises generating the catalog and transmitting the catalog to the first terminal. The method also comprises receiving a gift request from the first terminal requesting that a content gift selected from the identified content in the catalog be provided to the second terminal, and providing the content gift to the second terminal.

In one embodiment, apparatus is provided for operating a server to allow a first terminal to provide a content gift to a second terminal, where the first and second terminals selectively communicate with the server. The apparatus comprises a catalog request receiver for receiving a catalog request from the first terminal for a catalog that identifies content compatible with the second terminal, and a database for generating the catalog. The apparatus also comprises a catalog transmitter for transmitting the catalog to the first terminal. The apparatus also comprises a gift receiver for receiving a gift request from the first terminal requesting that a content gift selected from the identified content in the catalog be provided to the second terminal, and logic for providing the content gift to the second terminal.

In one embodiment, a computer-readable media is provided that comprises instructions, which when executed by a processor in a server, operate to allow a first terminal to provide a content gift to a second terminal, where the first and second terminals selectively communicate with the server. The computer-readable media comprises instructions for receiving a catalog request from the first terminal for a catalog that identifies content compatible with the second terminal, and instructions for generating the catalog. The computer-readable media also comprises instructions for transmitting the catalog to the first terminal. The computer-readable media also comprises instructions for receiving a gift request from the first terminal requesting that a content gift selected from the identified content in the catalog be provided to the second terminal, and instructions for providing the content gift to the second terminal.

In one embodiment, a method is provided for operating a first terminal to provide a content gift to a second terminal, where the first and second terminals selectively communicate with a gift server. The method comprises transmitting a catalog request to the gift server to obtain a catalog that identifies content compatible with the second terminal. The method also comprises receiving the catalog, and selecting a content gift from the catalog. The method also comprises transmitting a gift request to the gift server requesting that the content gift be provided to the second terminal.

In one embodiment, apparatus is provided for use in a first terminal to provide an content gift to a second terminal, where the first and second terminals selectively communicate with a server. The apparatus comprises a catalog request transmitter that operates to transmit a catalog request to the server to obtain a catalog that identifies content compatible with the second terminal. The apparatus also comprises a catalog receiver that operates to receive the catalog, and selection logic that operates to select a content gift from the catalog. The apparatus also comprises a gift request transmitter that operates to transmit a gift request to the server requesting that the content gift be provided to the second terminal.

In one embodiment, apparatus is provided for use in a first terminal to provide an content gift to a second terminal, where the first and second terminals selectively communicate with a server. The apparatus comprises means for transmitting a catalog request to the server to obtain a catalog that identifies content compatible with the second terminal, and means for receiving the catalog. The apparatus also comprises means for selecting a content gift from the catalog, and means for transmitting a gift request to the server requesting that the content gift be provided to the second terminal.

In one embodiment, a computer-readable media is provided that comprises instructions, which when executed by a processor in a first terminal, operate to provide an content gift to a second terminal, where the first and second terminals selectively communicate with a server. The computer-readable media comprises instructions for transmitting a catalog request to the gift server to obtain a catalog that identifies content compatible with the second terminal. The computer-readable media also comprises instructions for receiving the catalog, and instructions for selecting a content gift from the catalog. The computer-readable media also comprises instructions for transmitting a gift request to the gift server requesting that the content gift be provided to the second terminal.

In one embodiment, a method is provided for operating a first terminal to provide a content gift to a second terminal, wherein the first and second terminals selectively communicate with each other over a data network. The method comprises transmitting a catalog request to the second terminal to obtain a catalog that identifies content compatible with the second terminal. The method also comprises receiving the catalog, selecting a content gift from the catalog, and transmitting a gift request to a gift server, wherein the gift server provides the content gift to the second terminal.

Other aspects, advantages, and features of the present invention will become apparent after review of the hereinafter set forth Brief Description of the Drawings, Detailed Description of the Invention, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION OF THE INVENTION

The following detailed description describes one or more embodiments of a gifting system that includes methods and apparatus to allow a user of a first terminal in a data network to give a content gift to a user of a second terminal in the network. In one embodiment, the gifting system assembles a catalog of content that is compatible with the second terminal and transmits the catalog to the first terminal. The user of the first terminal selects a specific content gift to be given to the second terminal. The selection is transmitted to a gift server that operates to provide the selected content gift to the second terminal. The user of the first terminal assumes the cost of the content gift. The first and second terminals may be any type of wired or wireless terminals, including but not limited to, desktop computers, notebook computers, wireless telephones, pagers, PDAs, email devices, tablet computers, or other type of wired or wireless devices.

In one or more embodiments, the gifting systems interacts with a runtime environment executing on the device that is used to simplify operation of the device, such as by providing generalized calls for device specific resources. One such runtime environment is the Binary Runtime Environment for Wireless® (BREW™) software platform developed by QUALCOMM, Inc., of San Diego, Calif. In the following description, it will be assumed that one embodiment of a gifting system is implemented using a wireless device that is executing a runtime environment, such as the BREW software platform. However, one or more embodiments of the gifting system are suitable for use with other types of runtime environments to provide content gifts to wired and wireless devices. Furthermore, the term "content" is use herein to describe any type of application, multimedia file, image file, executable, program, web page, script, document, presentation, message, data, meta-data, or any other type of content or information that may be rendered, processed, or executed on a device.

Figure 1:
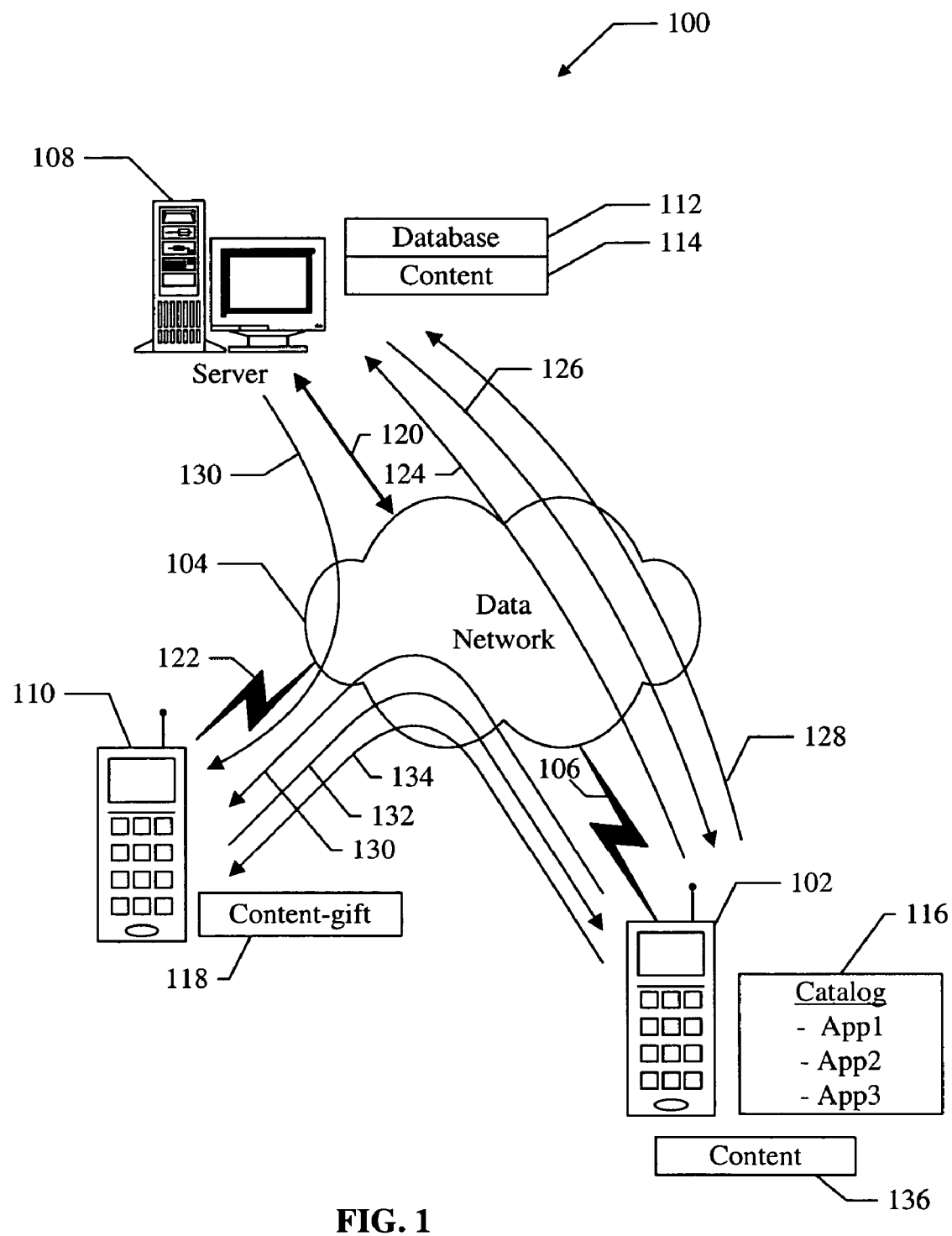
FIG. 1 shows one embodiment of a gifting system that allows a content gift to be provided to a terminal in a data network.

FIG. 1 shows one embodiment of a gifting system 100 that allows a gift to be provided to a terminal in a data network. The system 100 comprises a first wireless terminal 102 that communicates with a data network 104 via a wireless communication channel 106. The data network 104 comprises any type of data network that may include, but is not limited to, a wired, wireless, private, or public data network, or any combination thereof.

The system 100 also comprises a server 108 (also known as a "gift-server") that is coupled to the network 104 via a communication channel 120 to provide services to devices in communication with the network 104. For example, the wireless terminal 102 may be a wireless telephone, and the server 108 may be part of a nationwide telecommunications network that provides telecommunication services to the telephone. The communication channel 120 may be any type of wired or wireless communication channel.

Also in communication with the network 104 is a second terminal 110. The terminal 110 is in communication with the data network 104 via the wireless communication channel 122. The terminal 110 may be any type of wireless device.

In one embodiment, the server 108 comprises a database 112 and downloadable content 114. The database 112 comprises information about the operation of the data network 104 and information about the terminal devices supported by the server 108. For example, the database 112 includes information about the hardware and software configurations of the terminals 102 and 110. Thus, the database 112 comprises identifying information and configuration information about network terminals.

The content 114 comprises any type of application, executable, image file, multimedia file, data file, or any other type of content file. The content 114 may include applications designed for a specific type of device or content that is operable on a wide variety of devices. The files included in the content 114 have associated identifiers that can be used to identify each file.

In one embodiment, the gifting system operates to allow the user of the first terminal 102 to give a content gift to the user of the second terminal 110. For example, the content gift may comprise one or more applications, programs, executables, data files, content files, or any other available files selected from the content 114. Because the gift is selected from a catalog of compatible content, the selected content gift is compatible with the terminal 110. In one or more embodiments, the gifting system 100 operates to provide the content gift by performing one or more of the following steps.

Terminal 102 transmits a request to the server 108 (as show by path 124) to receive a catalog of content files that are compatible with the terminal 110. The requests includes an identifier that identifies the terminal 110 and any authorization information that may be necessary for the server 108 to verify the request.

The server 108 receives and verifies the request and uses the identifier to compile a list of content files that are compatible with terminal 110. For example, the server 108 uses the identifier to search the database 112 to determine the configuration of the terminal 110 and compatible content files from the available content 114.

The server 108 transmits a catalog 116 of compatible content files to the terminal 102 (as shown by path 126). For example, the catalog 116 contains a list of identifiers that identify content files that are compatible with the hardware/software of the terminal 110. For example, the catalog 116 identifies three applications that are compatible with the terminal 110. The catalog may also indicate whether or not the terminal 110 already owns any of the content files.

The user of terminal 102 selects one or more content files from the received catalog 116 to be content gifts, and transmits a gift request that includes the selection of the content gifts to the server 108 (as shown by path 128).

The server 108 receives and authenticates the gift request and updates the database 112 to show that terminal 110 has been given a content gift. The server 108 may also update its records to show that the user of terminal 102 will pay the costs associated with the selected content gift.

When communication is established between the server 108 and the terminal 110, the content gift 118 is transmitted to the terminal 110 (as shown by path 130). The user of terminal 110 may then use the information gift 118 because the content gift 118 is known to be compatible with the terminal 110.

For the purpose of this description, it will be assumed that entities transmitting the above-described information are properly credentialed using any type of known credentialing or authentication technique, so that any receiving device can verify that it is receiving information from a trusted source.

In one or more embodiments, the server 108, the terminal 102, and the terminal 110 may be any type of devices and their associated connections to the data network 104 may be wireless, wired, or any combination thereof. Thus, embodiments of the gifting system may be implemented using virtually any network configuration having a variety of servers and terminals that operate to provide the functions of the gifting system as described herein.

In one or more embodiments, the gifting system utilizes one or more security techniques to provide security and/or privacy during the gifting process. For example, in one embodiment, the gift-server requires secret security codes from the gift-giver before processing the catalog request. The security codes may comprise the identity of the gift-receiver, a PIN number or other security code, or any other type of security information, so that the security and privacy of the gift-receiver can be maintained. Therefore, the gift-giver must provide proper authorization to the gift-server before receiving private information about the gift-receiving terminal or its user.

In another embodiment, the gifting system 100 operates to allow a gift to be provided to a terminal in a data network using a peer-to-peer transaction. For example, the terminals 102 and 110 may communicate with each other to allow the terminal 102 to provide a content gift to the terminal 110. In one embodiment, the gifting system 100 operates to allow the terminal 102 to communicate peer-to-peer with terminal 110 to provide the content gift by performing one or more of the following steps.

Terminal 102 transmits a request to the terminal 110 (as show by path 130) to receive a catalog of content files that are compatible with the terminal 110. The request includes any required authentication information to allow a catalog of information to be obtained by the terminal 102.

The terminal 110 receives and verifies the request and compiles a list of content files that are compatible with terminal 110. For example, the terminal may already know what content is compatible, or may content the server 108 to determine what content is compatible.

The terminal 110 transmits a catalog 116 of compatible content files to the terminal 102 (as shown by path 132). For example, the catalog 116 contains a list of identifiers that identify content files that are compatible with the hardware/software of the terminal 110. For example, the catalog 116 identifies three applications that are compatible with the terminal 110.

The user of terminal 102 selects one or more content files from the received catalog 116 to be content gifts, and transmits a gift request to the server 108 that includes the selection of the content gifts (as shown by path 128). In another embodiment, the terminal 102 already has the content gift as part of content 136, and so no gift request is sent to the server 108.

If the server 108 receives a gift request it authenticates the gift request and updates the database 112 to show that terminal 110 has been given a content gift. The server 108 may also update its records to show that the user of terminal 102 will pay the costs associated with the selected content gift. If the terminal 102 already has the content gift as part of the content 136, the terminal 102 transmits the content gift to the terminal 102, as shown by path 134.

Thus, the terminals 102 and 110 may communicate in a peer-to-peer fashion to allow the terminal 102 to provide a content gift to the terminal 110.

Figure 2:
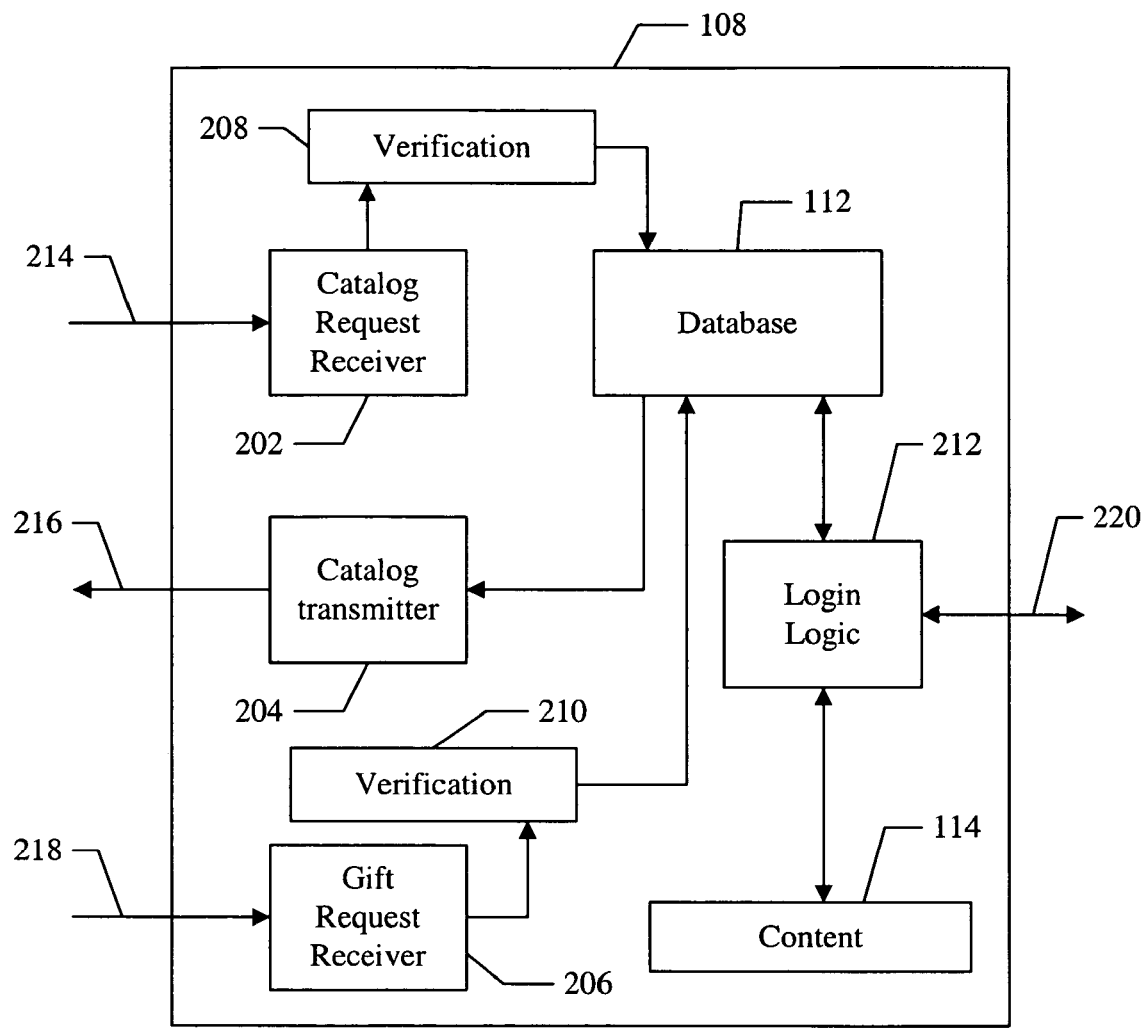
FIG. 2 shows a functional diagram of one embodiment of a server for use in one embodiment of a gifting system.

FIG. 2 shows a functional diagram of one embodiment of the server 108 for use in one or more embodiments of a gifting system. The server 108 comprises the database 112 and the content 114. The server 108 also comprises a catalog request receiver 202, a catalog transmitter 204, and a gift request receiver 206. The server 108 also comprises verification logic 208, 210 and login logic 212.

The database 112 comprises information about network terminals, such as terminal identifiers and associated software and hardware configuration information. The content 114 comprises any type of application, executable, program file, or any other type of content file that may be processed by a terminal device.

In one embodiment, the catalog request receiver 202, the catalog transmitter 204, and the gift request receiver 206 comprise a processor, CPU, gate array, logic, software or any combination thereof. For example, in one embodiment, a processor executing program instructions provides the functions of the receiver 202, the transmitter 204, and the receiver 206.

In one or more embodiments, the server 108 generally comprises logic to execute machine-readable instructions to perform the functions described herein. For example, instructions may be loaded into the server 108 from a computer-readable media, such as a floppy disk, CDROM, Flash memory, or other computer-readable media that interfaces to the server 108. In another embodiment, the instructions may be downloaded into the server 108 from a network resource, such as a network server or any other type of network resource that interfaces to the server 108. The instructions, when executed by the server 108, provide one or more embodiments of a gifting system as described herein.

The catalog request receiver 202 operates to receive a request for a catalog that contains a list of identifiers that identify one or more content files of the content 114. A communication channel 214 couples the receiver 202 to external devices or systems. For example, the channel 214 may be a network connection that couples the receiver 202 to a data network to receive catalog requests. In one or more embodiments, the channel 214 may be any type of communication channel that operates to couple the receiver 202 to other devices.

The catalog transmitter 204 operates to transmit a catalog to an external device or system. A communication channel 216 couples the transmitter 204 to external devices or systems. For example, the channel 216 may be a network connection that couples the transmitter 202 to a data network to transmit catalogs to other devices. In one or more embodiments, the channel 216 may be any type of communication channel that operates to couple the transmitter 204 to other devices.

The gift request receiver 206 operates to receive gift requests from external devices or systems. A gift requests identifies a content gift to be provided to an identified terminal. For example, the database 112 comprises information about terminals serviced by the server 108. A communication channel 218 couples the receiver 206 to external devices or systems. For example, the channel 218 may be a network connection that couples the receiver 206 to a data network to receive gift requests. In one or more embodiments, the channel 218 may be any type of communication channel that operates to couple the receiver 206 to other devices.

The login logic 212 operates to process login input received from one or more terminals that are serviced by the server 108. For example, the server may be part of a data network and operates to provide network services to multiple terminal devices. The login logic 212 communicates with various terminals using a communication channel 220. For example, the channel 220 may be a network connection that couples the login logic 212 to a data network to communicate with various terminals. In one or more embodiments, the channel 220 may be any type of communication channel that operates to couple the login logic 212 to other devices.

In one embodiment, the login logic 212 operates to communicate with the gift-receiving terminal to determine what content is owned by that terminal. For example, the gift-receiving terminal may have independently acquired the intended content gift and this information can be discovered by the login logic 212. For example, the login logic 212 queries the gift-receiving terminal about the content it owns via the channel 220. In one embodiment, if the logic 212 discovers that the gift-receiving terminal has independently acquired the intended content gift, then the logic 212 operates to terminate the gift. In this case, the gift-giving terminal will be refunded any costs associated with the intended gift (i.e., the database 112 will be updated) and a notification message will be transmitted to the gift-giving terminal that indicates that the content gift was not provided to the second terminal. Thus, it is possible for the gifting system to avoid giving a content gift that duplicates the content owned by the gift-receiving terminal.

In one embodiment, the communication channels 214, 216, 218, and 220 are independent channels. In another embodiment, the channels 214, 216, 218, and 220 are the same channel. The channels 214, 216, 218, and 220 may comprise any type of wired or wireless channel, or any combination thereof. Thus, any configuration may be used to allow the functional elements of the server 108 to communication with external devices or systems.

It should be noted that the server 108 illustrates just one embodiment, and that other server configurations are possible to provide the functions described herein. For example, it is possible that the functional elements of the server 108 be combined, rearranged, changed, added to, or deleted within the scope of the described embodiments.

Figure 3:
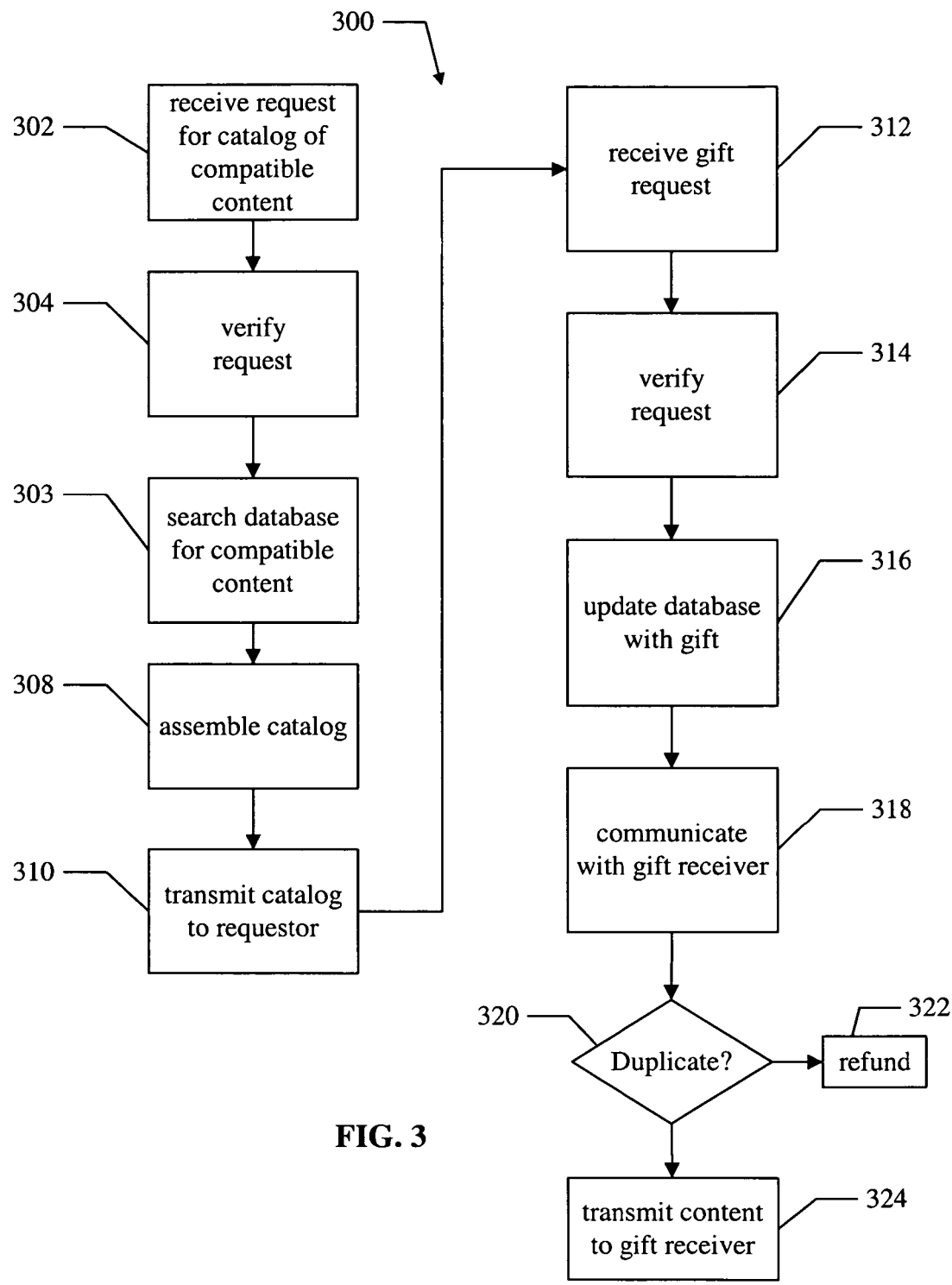
FIG. 3 shows one embodiment of a method for use in server to provide one embodiment of a gifting system.

FIG. 3 shows one embodiment of a method 300 for use in server to provide one embodiment of a gifting system. For the purpose of clarity, the operation of the method 300 will be described with reference to the server 108 shown in FIG. 2.

At block 302, a request for a catalog is received at the server. For example, a terminal communicates with the server 108 via the channel 214 to request a catalog of content compatible with a gift-receiving terminal. The request includes information to identify a requesting terminal and the gift-receiving terminal.

At block 304, the request for a catalog is verified. For example, the verification logic 208 operates to verify that the requesting terminal is authorized to request the catalog and receive private information about the gift-receiving terminal. Any type of authorization and/or verification technique may be used to verify the request.

At block 306, the request is used to compile a catalog that identifies content that is compatible with the gift-receiving terminal. For example, the request is sent from the verification logic 208 to the database 112 where the identifier of the gift-receiving terminal is used to assemble a catalog identifying compatible content. For example, the database includes hardware and software configuration information about the gift-receiving terminal. The configuration information is used to determine which of the files included in the content 114 is compatible with the gift-receiving terminal. In one embodiment, the catalog also includes information about content currently owned by the gift-receiving terminal.

At block 308, a listing identifying all compatible content is assembled into a catalog file, which may be in any suitable type of file format. The catalog file may also include any other information relevant to the operation or configuration of the gift-receiving terminal. For example, the catalog file may include information about current content and licenses associated with the gift-receiving terminal.

At block 310, the assembled catalog is transmitted to the gift-giving terminal that requested the catalog. For example, the compiled catalog of compatible content is sent from the database 112 to the catalog transmitter 216, which then transmits the catalog to the gift-giving terminal via the communication channel 216.

At block 312, a gift request is received at the server 108. For example, the gift request receiver 206 receives the gift request via the channel 218. In one embodiment, a terminal that has received the catalog and selected one or more compatible content files to give as a gift to another terminal generates the gift request. The gift request includes information to identify the gift-giving terminal, a content gift, and the gift-receiving terminal.

At block 314, the server verifies the gift request. For example, the verification logic 210 operates to verify that the requesting terminal is authorized to request a gift. Any type of authorization and/or verification technique may be used to verify the request.

At block 314, the server verifies the gift request. For example, the verification logic 210 operates to verify that the requesting terminal is authorized to request a gift. Any type of authorization and/or verification technique may be used to verify the request.

At block 318 the server establishes communication with the gift-receiving terminal. For example, in one embodiment, communication is established when the gift-receiving terminal logs in to the login logic 212 via the channel 220. Communication with the gift-receiving terminal may also be established in any other way. For example, the server 108 may initiate communication with the gift-receiving terminal.

At block 320, a test is performed to see if the gift-receiving terminal has already acquired the content gift. In one embodiment, the gift server 108 contacts the gift-receiving terminal 110 to determine if the content gift already resides on the gift-receiving terminal 110. For example, during the time that the gift-giving terminal 102 was processing the catalog to select a content gift to give, the gift-receiving terminal acquired the selected content gift by some other means. For example, the gift-receiving terminal purchased the content independently. If the gift-receiving terminal already has the content, then a gift of the identical content would result in duplicate content on the gift-receiving terminal. It is desirable to avoid such a duplicate situation. Thus, if the gift-receiving terminal already has the selected content, the method proceeds to block 322, and if the selected content does not already reside on the gift-receiving terminal, the method proceeds to block 324.

At block 322, it has been determined that the content gift already resides on the gift-receiving terminal so a refund is provided to the gift-giving terminal. For example, the database on the gift-server is updated to reflect that the gift was not given and no costs are to be charged to the gift-giving terminal. In one embodiment, a notification is sent to the gift-giving terminal to notify that terminal that the content gift was not provided to avoid duplicate content on the gift-receiving terminal. It is also possible to send a notification to the gift-receiving terminal that a content gift was returned because of duplicate content.

At block 324, the gift-receiving terminal does not already own the content gift, so the content gift is transmitted to the gift-receiving terminal. For example, in one embodiment, the selected content gift is retrieved from the content 114 by the login logic 212 and transmitted to the gift-receiving terminal via the channel 220. Any other technique may be used to transmit the content gift to the gift-receiving terminal.

Thus, the method 300 operates to provide a content gift in a data network. It should be noted that the method 300 illustrates just one method and that it is possible to rearrange, change, combine, or delete method steps within the scope of the described embodiments.

Figure 4:
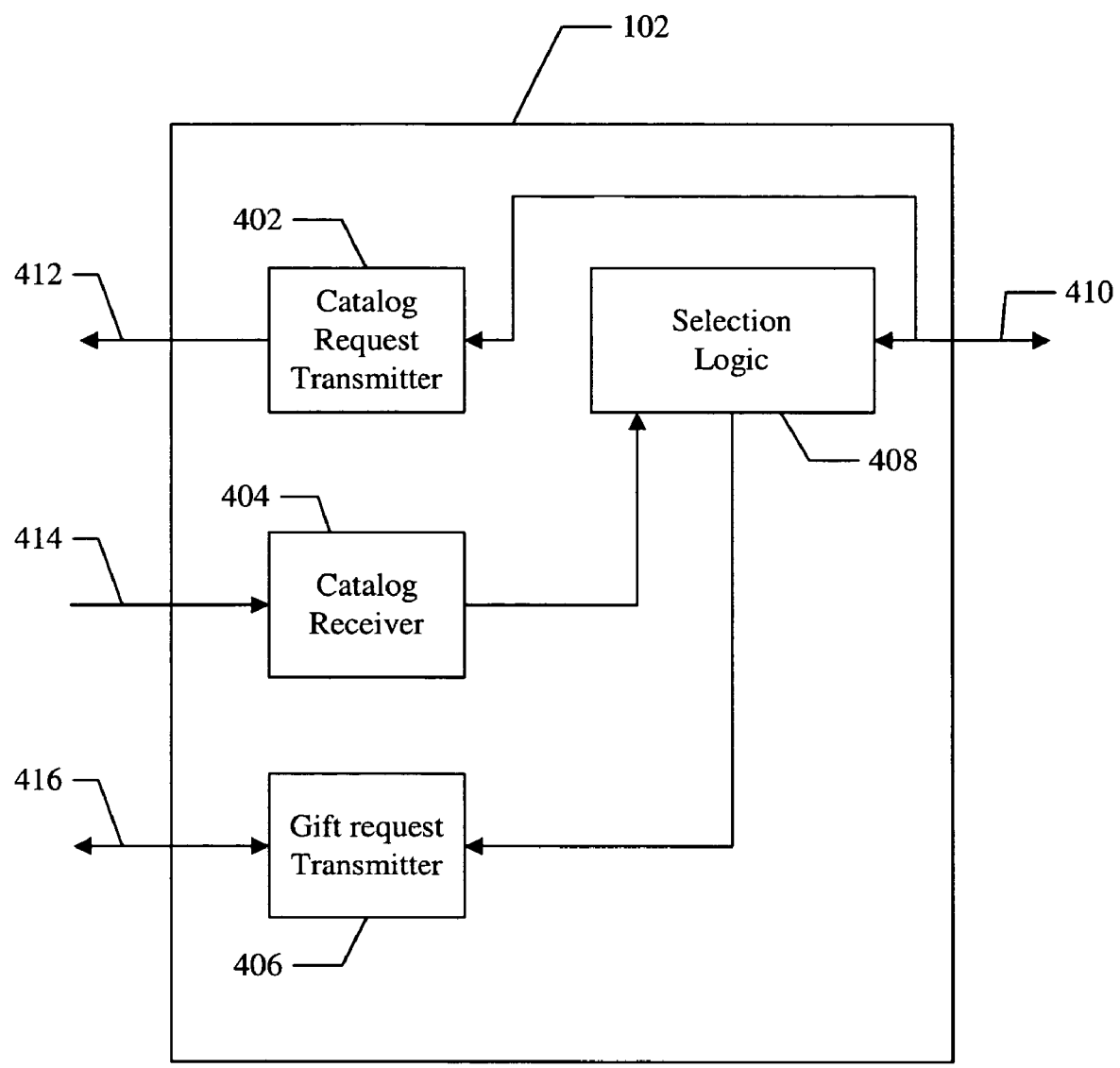
FIG. 4 shows a functional diagram of one embodiment of a terminal device for use in one embodiment of a gifting system.

FIG. 4 shows a functional diagram of one embodiment of the terminal 102 for use in one embodiment of a gifting system. The terminal 102 comprises a catalog request transmitter 402, catalog receiver 404, gift request transmitter 406, and selection logic 408.

In one embodiment, the catalog request transmitter 402, catalog receiver 404, gift request transmitter 406, and selection logic 408 comprise a processor, CPU, gate array, logic, software or any combination thereof. For example, in one embodiment, a processor executing program instructions may provide the functions of any or all of the receiver transmitter 402, the receiver 404, the transmitter 406, and the selection logic 408.

In one or more embodiments, the terminal 102 generally comprises logic to execute machine-readable instructions to perform the functions described herein. For example, instructions may be loaded into the terminal 102 from a computer-readable media, such as a floppy disk, CDROM, Flash memory, or other computer-readable media that interfaces to the terminal 102. In another embodiment, the instructions may be downloaded into the terminal 102 from a network resource, such as a network server or any other type of network resource that interfaces to the terminal 102. The instructions, when executed by the terminal 102, provide one or more embodiments of a gifting system as described herein.

The catalog request transmitter 402 operates to transmit a request for a catalog to a gift server, such as the server 108. In one embodiment, the transmitter 402 receives information from a user input 410. The user input 410 allows the user of the terminal 102 to input information that is used as part of a catalog request. The information includes an identifier that identifies a gift-receiving terminal. The catalog request is transmitted via a communication channel 412 that allows communication with the gift server.

The catalog receiver 404 operates to receive a catalog from a gift server. The catalog includes a list identifying content that are compatible with the selected gift-receiving terminal. The catalog receiver 404 communicates with the gift server via the communication channel 414.

The selection logic 408 receives the catalog from the catalog receiver and displays it to the terminal user. The user then selects (using the user input 410) one or more content gifts to be given to the gift-receiving terminal.

The selections are sent to the gift request transmitter 406, which transmits a gift request to the gift server via the communication channel 416. In one embodiment, the gift request transmitter includes logic to receive a notification that the gift was not given to the gift-receiving terminal because the selected content gift is already owned by the gift-receiving terminal. For example, while the gift-giving terminal selects the content gift from the catalog, the gift-receiving terminal acquires the selected content gift by some other means. For example, the gift-receiving terminal acquires the selected content gift through an independent purchase. Thus, the gift server will not provide the content gift to the gift-receiving terminal to avoid duplicate content on the gift-receiving terminal. In one embodiment, the gift server sends a notification message that the content gift was not delivered to avoid a duplicate content situation. The notification message is received by logic at the gift request transmitter 406 for further processing at the gift-giving terminal.

In one embodiment, the communication channels 412, 414, and 416 are independent channels. In another embodiment, the channels 412, 414, and 416 are the same channel. The channels 412, 414, and 416 may comprise any type of wired or wireless channel, or any combination thereof. Thus, any configuration may be used to allow the functional elements of the terminal 102 to communication with external devices or systems.

It should be noted that the terminal 102 illustrates just one embodiment, and that other server configurations are possible to provide the functions described herein. For example, it is possible that the functional elements of the terminal 102 be combined, rearranged, changed, added to, or deleted within the scope of the described embodiments.

Figure 5:
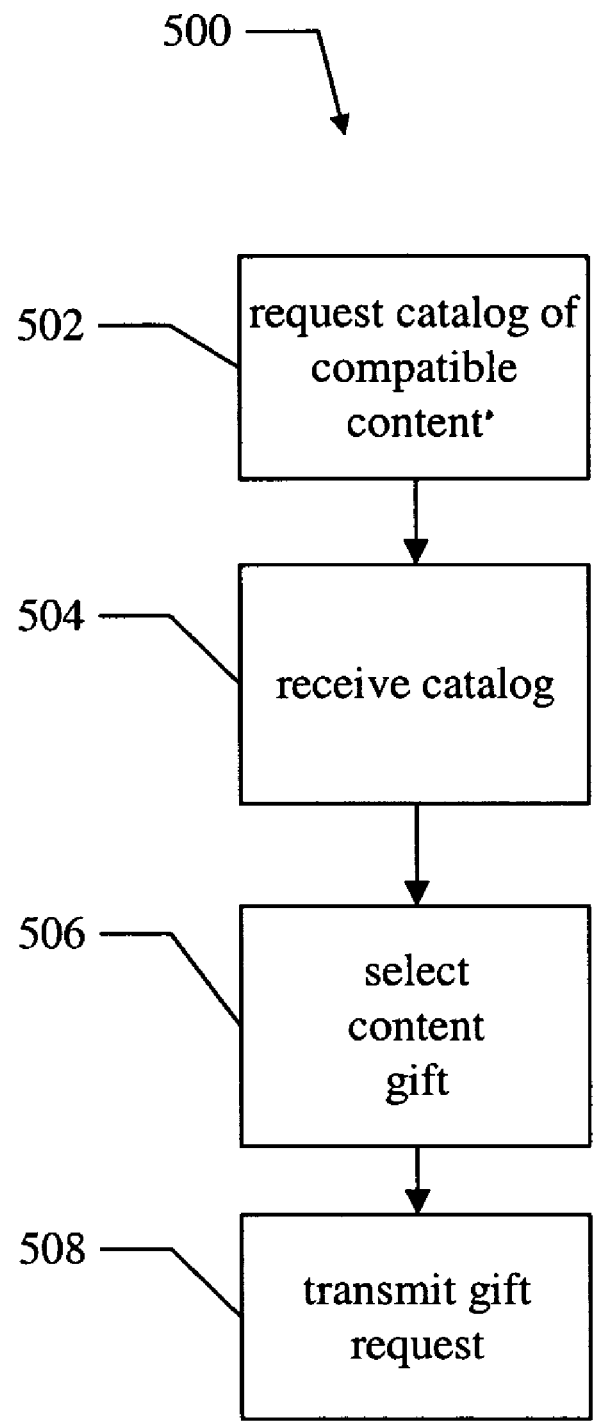
FIG. 5 shows one embodiment of a method for use in a terminal device to provide one embodiment of a gifting system.

FIG. 5 shows one embodiment of a method 500 for use in a terminal device to provide one embodiment of a gifting system. For example, the method 500 is suitable for use with the terminal 102 shown in FIG. 4. Therefore, for added clarity, the following detailed description of the method 500 includes additional references to the terminal 102 in FIG. 4.

At block 502, a catalog identifying content compatible with a gift-receiving terminal is requested. For example, the user of terminal 102 provides user input to the transmitter 402 via input 410. The user input comprises information that includes an identifier that identifies the gift-receiving terminal. The information is used to create a catalog request that is transmitted by the transmitter 402 to a gift server via the communication channel 412.

At block 504, the terminal receives a catalog that identifies content compatible with the gift-receiving terminal. For example, the gift server receives the catalog request, and after a verification process, compiles a list of content compatible with the gift-receiving terminal. The list is used to create the catalog that is transmitted to the terminal 102 and received by the catalog receiver 404 via the channel 414.

At block 506, the user of the terminal selects one or more content gifts from the catalog to be given to the gift-receiving terminal. For example, the received catalog is provided to the selection logic 408 and thereafter displayed to the terminal user. The terminal user selects the desired content gifts from the catalog via the user input 410.

At block 508, a gift request is transmitted from the terminal 102 to the gift server. The gift request includes one or more identifiers that identify content gifts that have been selected to be given to a gift-receiving terminal that is also identified in the request. For example, the user selects content gifts from the catalog to give as gifts to the gift-receiving terminal. The selections are incorporated into a gift request that is transmitted from the transmitter 406 to the gift server. When the gift server receives the gift request, the content gifts are provided to the gift-receiving terminal and the gift-giving terminal 102 assumes any costs associated with the content gifts.

The method 500 is intended to be illustrative and not limiting of the operation of the various embodiments described herein. For example, it would be obvious to one with skill in the art to make minor changes, additions or deletions to any of the described method steps. Furthermore, the described method steps may be combined, rearranged or reordered without deviating from the scope of the described embodiments.

Figure 6:
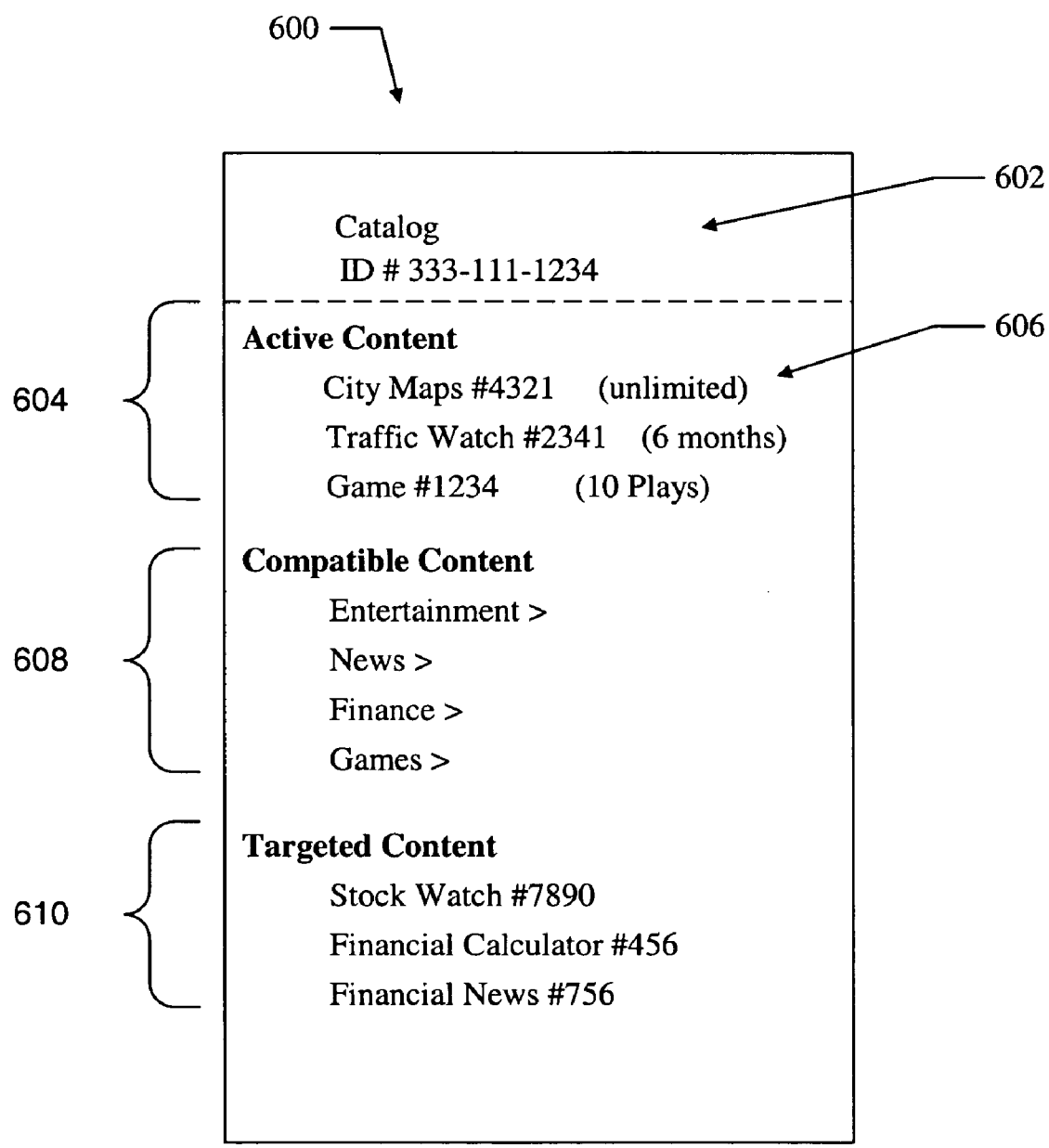
FIG. 6 shows one embodiment of a catalog for use in one or more embodiments of a gifting system.

FIG. 6 shows one embodiment of a catalog 600 for use in one or more embodiments of a gifting system. In one embodiment, the catalog is prepared by a gift server in response to a catalog request received from a gift-giving terminal. The catalog 600 comprises a header section 602 that identifies the gift-receiving terminal. The catalog 600 also comprises an active content section 604, a compatible content section 608, and a targeted content section 610.

The active content section 604 shows content that is currently owned by the gift-receiving terminal. The active content is owned or licensed by the gift-receiving terminal and the existing license information is provided at 606.

The compatible content section 608 shows content that is compatible with the gift-receiving terminal. For example, a gift-giver may select content gifts from several categories, such as entertainment, news, finance, or games.

The targeted content section 610 shows content that has been targeted for the gift-receiving terminal. For example, if the gift-receiving terminal is a member of a financial organization, the targeted content may be the content shown in section 610.

Therefore, the catalog 600 can be used in one embodiment of a gifting system to allow a content gift to be given to a gift-receiving terminal. It should be noted that the catalog 600 shows just one embodiment, and that other embodiments of a catalog are possible for use with one or more embodiments of a gifting system.

Figure 7:
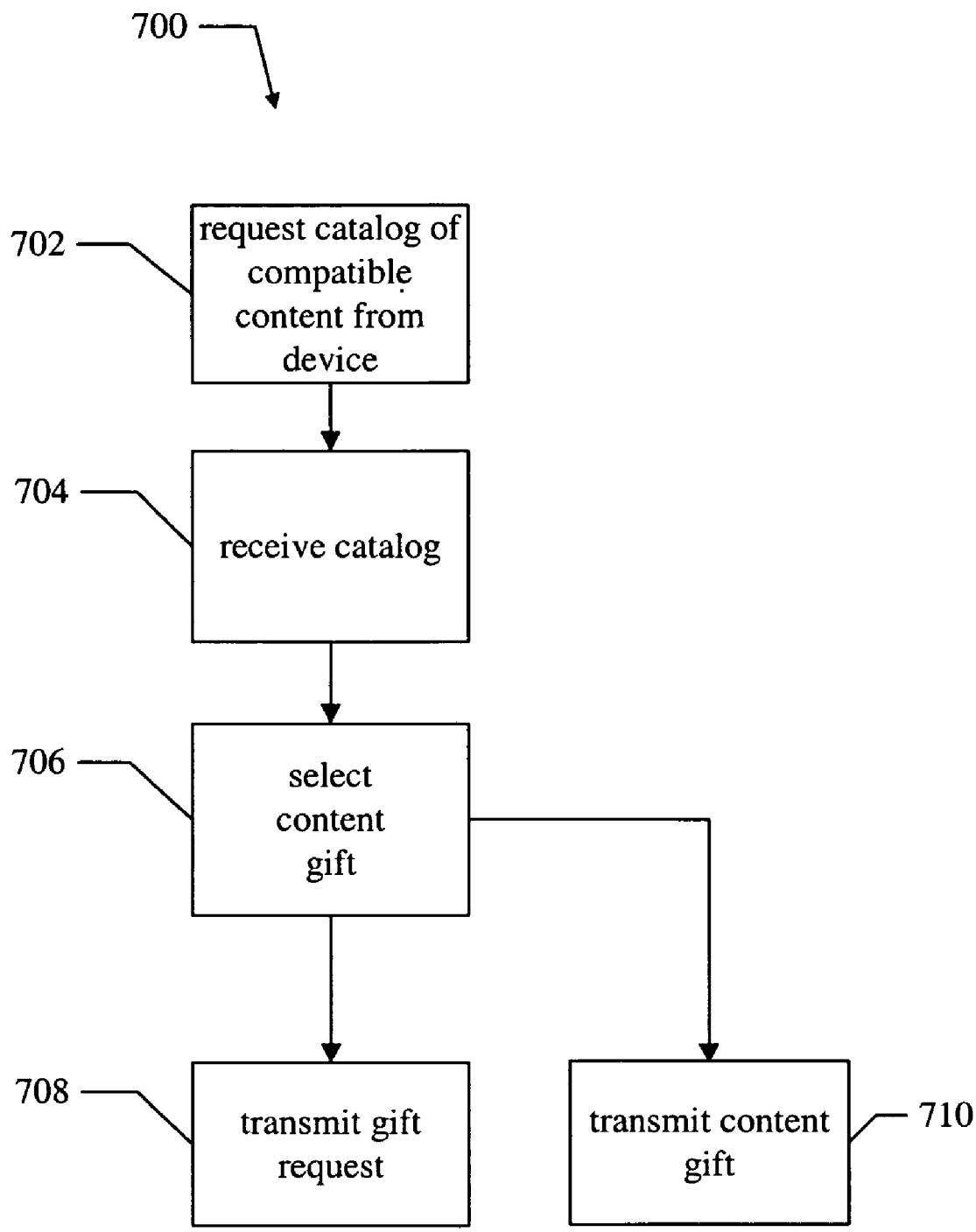
FIG. 7 shows one embodiment of a method for use in a terminal device to provide one embodiment of a gifting system using peer-to-peer communication.

FIG. 7 shows one embodiment of a method 700 for use in a terminal device to provide one embodiment of a gifting system using peer-to-peer communication. For example, the method 700 is suitable for use with the terminal 102 shown in FIG. 4. Therefore, for added clarity, the following detailed description of the method 700 includes additional references to the terminal 102 in FIG. 4.

At block 702, a catalog identifying content compatible with a gift-receiving terminal is requested. For example, the user of terminal 102 provides user input to the transmitter 402 via input 410. The user input comprises information that includes an identifier that identifies the gift-receiving terminal 110. The information is used to create a catalog request that is transmitted by the transmitter 402 to the gift-receiving terminal 110 using peer-to-peer communication, for example, by using the communication channel 412.

At block 704, the terminal receives a catalog that identifies content compatible with the gift-receiving terminal. For example, the terminal 110 receives the catalog request, and after a verification process, compiles a list of compatible content. In one embodiment, information about compatible content is available at the terminal 110. In another embodiment, the terminal 110 requests information about compatible content from a gift server, for example, the server 108. The information about compatible content is used to create the catalog that is transmitted from the terminal 110 to the terminal 102 and received by the catalog receiver 404 via the channel 414.

At block 706, the user of the gift-giving terminal selects one or more content gifts from the catalog to be given to the gift-receiving terminal. For example, the received catalog is provided to the selection logic 408 and thereafter displayed to the terminal user. The terminal user selects the desired content gifts from the catalog via the user input 410.

In one embodiment, the method 700 proceeds to block 708 where a gift request is transmitted from the terminal 102 to the gift server. The gift request includes one or more identifiers that identify content gifts that have been selected to be given to a gift-receiving terminal that is also identified in the request. For example, the user selects content gifts from the catalog to give as gifts to the gift-receiving terminal. The selections are incorporated into a gift request that is transmitted from the transmitter 406 to the gift server 108. When the gift server receives the gift request, the content gifts are provided to the gift-receiving terminal 110 and the gift-giving terminal 102 assumes any costs associated with the content gifts.

In another embodiment, the method proceeds to block 710 where the gift-giving terminal 102 transmits the content gift directly to the gift-receiving terminal 110. For example, using peer-to-peer communication, a content gift located at the terminal 102 is transmitted to the gift-receiving terminal 110.

Thus, it is possible for the gifting system to provide content gifts to a terminal in a data network using a variety of methods to generate a catalog of compatible content and transmitting the selected content gift from one of several sources.

Accordingly, while one or more embodiments of methods and apparatus for providing gifts in a data network have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for operating a first terminal to provide a content gift to a second terminal, wherein the first and second gift terminals selectively communicate with a gift server, the method comprising:

transmitting a catalog request, including terminal identifier of the second terminal, to the gift server to obtain a catalog that identifies content compatible with the second terminal;

receiving the catalog at the first terminal;

selecting a content gift from the catalog;

automatically determining the selected content gift is not already owned by the second terminal; and transmitting a gift request for the gift server requesting that the content gift be provided to the second terminal.

2. The method of claim 1, further comprising including security information in the catalog request so that the catalog request can be authenticated.

3. The method of claim 1, further comprising requesting that the first terminal assume costs associated with the content gift.

4. The method of claim 1, wherein the step of transmitting the catalog request comprises transmitting the catalog request to the gift server using a wireless network connection.

5. The method of claim 1, wherein the step of transmitting the catalog request comprises transmitting the catalog request to the gift server using a wired network connection.

6. The method of claim 1, further comprising receiving a notification message that the content gift was not delivered to the second terminal because the content is already owned by the second terminal.

7. The method of claim 1, wherein at least one of the first and second terminals is a wireless device.

8. Apparatus for use with a first terminal to provide a content gift to a second terminal, wherein the first and second gift terminals selectively communicate with a gift server, the apparatus comprising:

a catalog request transmitter that operates to transmit a catalog request, including terminal identifier of the second terminal, to the gift server to obtain a catalog that identifies content compatible with the second terminal;

a catalog receiver that operates to receive the catalog at the first terminal;

a gift selector that operates to select a content gift from the catalog, wherein the gift selector automatically determines the selected content gift is not already owned by the second terminal; and a gift request transmitter that operates to transmit a gift request for the gift server requesting that the content gift be provided to the second terminal.

9. The apparatus of claim 8, wherein the catalog request transmitter further comprises logic to include security information in the catalog request so that the catalog request can be authenticated.

10. The apparatus of claim 8, wherein the gift request transmitter further comprising logic to request that the first terminal assume costs associated with the content gift.

11. The apparatus of claim 8, wherein the catalog request transmitter comprises logic to transmit the catalog request to the gift server using a wireless network connection.

12. The apparatus of claim 8, wherein the catalog request transmitter comprises logic to transmit the catalog request to the gift server using a wired network connection.

13. The apparatus of claim 8, wherein the gift request transmitter further comprises logic to receive a notification message that the content gift was not delivered to the second terminal because the content is already owned by the second terminal.

14. The apparatus of claim 8, wherein at least one of the first and second terminals is a wireless device.

15. A processor for use in a first terminal to provide a content gift to a second terminal, wherein the first and second gift terminals selectively communicate with a gift server, the processor comprising:
   means for transmitting a catalog request, including terminal identifier of the second terminal, to the gift server to obtain a catalog that identifies content compatible with the second terminal;
   means for receiving the catalog at the first terminal;
   means for selecting a content gift from the catalog;
   means for automatically determining the selected content gift is not already owned by the second terminal; and
   means for transmitting a gift request for the gift server requesting that the content gift be provided to the second terminal.

16. The processor of claim 15, further comprising means for including security information in the catalog request so that the catalog request can be authenticated.

17. The processor of claim 15, further comprising means for requesting that the first terminal assume costs associated with the content gift.

18. The processor of claim 15, wherein the means for transmitting the catalog request comprises means for transmitting the catalog request to the server using a wireless network connection.

19. The processor of claim 15, wherein the means for transmitting the catalog request comprises means for transmitting the catalog request to the server using a wired network connection.

20. The processor of claim 15, further comprises means for receiving a notification message that the content gift was not delivered to the second terminal because the content is already owned by the second terminal.

21. The processor of claim 15, wherein at least one of the first and second terminals is a wireless device.

22. A computer-readable medium comprising instructions, which when executed by a processor in a first terminal, operate to provide a content gift to a second terminal, wherein the first and second gift terminals selectively communicate with a gift server, the computer-readable medium comprising:
   instructions for transmitting a catalog request, including terminal identifier of the second terminal, to the gift server to obtain a catalog that identifies content compatible with the second terminal;
   instructions for receiving the catalog at the first terminal;
   instructions for selecting a content gift from the catalog;
   instructions for automatically determining the selected content gift is not already owned by the second terminal; and
   instructions for transmitting a gift request for the gift server requesting that the content gift be provided to the second terminal.

23. The computer-readable medium of claim 22, further comprising instructions for including security information in the catalog request so that the catalog request can be authenticated.

24. The computer-readable medium of claim 22, further comprising instructions for requesting that the first terminal assume costs associated with the content gift.

25. The computer-readable medium of claim 22, wherein the instructions for transmitting the catalog request comprise instructions for transmitting the catalog request to the gift server using a wireless network connection.

26. The computer-readable medium of claim 22, wherein the instructions for transmitting the catalog request comprise instructions for transmitting the catalog request to the gift server using a wired network connection.

27. The computer-readable medium of claim 22, further comprising instructions for receiving a notification message that the content gift was not delivered to the second terminal because the content is already owned by the second terminal.

28. The computer-readable medium of claim 22, wherein at least one of the first and second terminals is a wireless device.

29. A method for operating a server to allow a first terminal to provide a content gift to a second terminal, wherein the first and second gift terminals selectively communicate with the server, the method comprising:
   receiving a catalog request from the first terminal for a catalog that identifies content compatible with the second terminal;
   generating the catalog;
   transmitting the catalog to the first terminal;
   receiving a gift request from the first terminal requesting that a content gift selected from the catalog be provided to the second terminal;
   determining the content gift is content that is not already owned by the second terminal; and
   providing the content to the second terminal;
   wherein the step of generating comprises using a terminal identifier included in the catalog request to identify the content that is compatible with the second terminal.

30. The method of claim 29, wherein the step of receiving the catalog request further comprises authenticating the catalog request.

31. The method of claim 29, wherein the step of transmitting comprises transmitting the catalog to the first terminal using a communication channel that is selected from channels comprising wired and wireless communication channels.

32. The method of claim 29, further comprising associating the costs of the content gift with the first terminal.

33. The method of claim 29, wherein the step of providing the content gift comprises transmitting the content gift to the second terminal using a communication channel that is selected from channels comprising wired and wireless communication channels.

34. The method of claim 29, wherein at least one of the first and second terminals is a wireless device.

35. A method for operating a server to allow a first terminal to provide a content gift to a second terminal, wherein the first and second gift terminals selectively communicate with the server, the method comprising:
   receiving a catalog request from the first terminal for a catalog that identifies content compatible with the second terminal;
   generating the catalog;
   transmitting the catalog to the first terminal;
   receiving a gift request from the first terminal requesting that a content gift selected from the catalog be provided to the second terminal;
   determining the content gift is content that is not already owned by the second terminal; and
   providing the content to the second terminal;
   wherein the step of generating comprises:
      using a terminal identifier included in the catalog request to identify targeted content that is compatible with the second terminal; and
      generating the catalog so that it identifies the targeted content.

36. A method for operating a server to allow a first terminal to provide a content gift to a second terminal, wherein the first and second gift terminals selectively communicate with the server, the method comprising:
  receiving a catalog request from the first terminal for a catalog that identifies content compatible with the second terminal;
  generating the catalog;
  transmitting the catalog to the first terminal;
  receiving a gift request from the first terminal requesting that a content gift selected from the catalog be provided to the second terminal;
  determining the content gift is already owned by the second terminal; and
  transmitting a notification message to the first terminal to indicate that content gift was not provided to the second terminal.

37. A processor for operating a server to allow a first terminal to provide a content gift to a second terminal, wherein the first and second gift terminals selectively communicate with the server, the processor comprising:
  means for receiving a catalog request from the first terminal for a catalog that identifies content compatible with the second terminal;
  means for generating the catalog;
  means for transmitting the catalog to the first terminal;
  means for receiving a gift request from the first terminal requesting that a content gift selected from the catalog be provided to the second terminal;
  means for determining the content gift is content that is not already owned by the second terminal; and
  means for providing the content to the second terminal;
  wherein the means for generating comprises means for using a terminal identifier included in the catalog request to identify the content that is compatible with the second terminal.

38. The processor of claim 37, wherein the means for receiving the catalog request further comprises means for authenticating the catalog request.

39. The processor of claim 37, wherein the means for transmitting comprises means for transmitting the catalog to the first terminal using a communication channel that is selected from channels comprising wired and wireless communication channels.

40. The processor of claim 37, further comprising means for associating the costs of the content gift with the first terminal.

41. The processor of claim 37, wherein the means for providing the content gift comprises means for transmitting the content gift to the second terminal using a communication channel that is selected from channels comprising wired and wireless communication channels.

42. The processor of claim 37, wherein at least one of the first and second terminals is a wireless device.

43. A processor for operating a server to allow a first terminal to provide a content gift to a second terminal, wherein the first and second gift terminals selectively communicate with the server, the processor comprising:
  means for receiving a catalog request from the first terminal for a catalog that identifies content compatible with the second terminal;
  means for generating the catalog;
  means for transmitting the catalog to the first terminal;
  means for receiving a gift request from the first terminal requesting that a content gift selected from the catalog be provided to the second terminal;
  means for determining the content gift is content that is not already owned by the second terminal; and
  means for providing the content to the second terminal;
  wherein the step of generating comprises:
    means for using a terminal identifier included in the catalog request to identify targeted content that is compatible with the second terminal; and
    means for generating the catalog so that it identifies the targeted content.

44. A processor for operating a server to allow a first terminal to provide a content gift to a second terminal, wherein the first and second gift terminals selectively communicate with the server, the processor comprising:
  means for receiving a catalog request from the first terminal for a catalog that identifies content compatible with the second terminal;
  means for generating the catalog;
  means for transmitting the catalog to the first terminal;
  means for receiving a gift request from the first terminal requesting that a content gift selected from the catalog be provided to the second terminal;
  means for determining the content gift is already owned by the second terminal; and
  means for transmitting a notification message to the first terminal to indicate that content gift was not provided to the second terminal.

45. Apparatus for operating a server to allow a first terminal to provide a content gift to a second terminal, wherein the first and second gift terminals selectively communicate with the server, the processor comprising:
  a catalog request receiver for receiving a catalog request from the first terminal for a catalog that identifies content compatible with the second terminal;
  a database for generating the catalog;
  a catalog transmitter for transmitting the catalog to the first terminal;
  a gift receiver for receiving a gift request from the first terminal requesting that a content gift selected from the catalog be provided to the second terminal, wherein the gift receiver determines the content gift is content that is not currently owned by the second terminal; and
  a gift transmitter for providing the content to the second terminal;
  wherein the database comprises logic for using a terminal identifier included in the catalog request to identify the content that is compatible with the second terminal.

46. The apparatus of claim 45, wherein the catalog request receiver further comprises logic for authenticating the catalog request.

47. The apparatus of claim 45, wherein the catalog transmitter comprises logic for transmitting the catalog to the first terminal using a communication channel that is selected from channels comprising wired and wireless communication channels.

48. The apparatus of claim 45, wherein the database further comprises logic for associating the costs of the content gift with the first terminal.

49. The apparatus of claim 45, wherein the logic for providing the content gift comprises logic for transmitting the content gift to the second terminal using a communication channel that is selected from channels comprising wired and wireless communication channels.

50. The apparatus of claim 45, wherein at least one of the first and second terminals is a wireless device.

51. Apparatus for operating a server to allow a first terminal to provide a content gift to a second terminal, wherein the first and second gift terminals selectively communicate with the server, the processor comprising:
- a catalog request receiver for receiving a catalog request from the first terminal for a catalog that identifies content compatible with the second terminal;
- a database for generating the catalog;
- a catalog transmitter for transmitting the catalog to the first terminal;
- a gift receiver for receiving a gift request from the first terminal requesting that a content gift selected from the catalog be provided to the second terminal, wherein the gift receiver determines the content gift is content that is not currently owned by the second terminal; and
- a gift transmitter for providing the content to the second terminal;
- wherein the database comprises:
  - logic for using a terminal identifier included in the catalog request to identify targeted content that is compatible with the second terminal; and
  - logic for generating the catalog so that it identifies the targeted content.

52. A processor for operating a server to allow a first terminal to provide a content gift to a second terminal, wherein the first and second gift terminals selectively communicate with the server, the processor comprising:
- a catalog request receiver for receiving a catalog request from the first terminal for a catalog that identifies content compatible with the second terminal;
- a database for generating the catalog;
- a catalog transmitter for transmitting the catalog to the first terminal;
- a gift receiver for receiving a gift request from the first terminal requesting that a content gift selected from the catalog be provided to the second terminal;
- wherein the database comprises:
  - logic for determining the content gift is already owned by the second terminal; and
  - logic for transmitting a notification message to the first terminal to indicate that content gift was not provided to the second terminal.

53. A computer-readable medium comprising instructions, which when executed by a processor in a server, operate to allow a first terminal to provide a content gift to a second terminal, wherein the first and second gift terminals selectively communicate with the server, the computer-readable medium comprising:
- instructions receiving a catalog request from the first terminal for a catalog that identifies content compatible with the second terminal;
- instructions for generating the catalog;
- instructions for transmitting the catalog to the first terminal;
- instructions for receiving a gift request from the first terminal requesting that a content gift selected from the catalog be provided to the second terminal;
- instructions for determining the content gift is content that is not already owned by the second terminal; and
- instructions for providing the content to the second terminal;
- wherein the instructions for generating comprise instructions for using a terminal identifier included in the catalog request to identify the content that is compatible with the second terminal.

54. The computer-readable medium of claim 53, wherein the instructions for receiving the catalog request further comprise instructions for authenticating the catalog request.

55. The computer-readable medium of claim 53, wherein the instructions for transmitting comprise instructions for transmitting the catalog to the first terminal using a communication channel that is selected from channels comprising wired and wireless communication channels.

56. The computer-readable medium of claim 53, further comprising instructions for associating the costs of the content gift with the first terminal.

57. The computer-readable medium of claim 53, wherein the instructions for providing the content gift comprise instructions for transmitting the content gift to the second terminal using a communication channel that is selected from channels comprising wired and wireless communication channels.

58. The computer-readable medium of claim 53, wherein at least one of the first and second terminals is a wireless device.

59. A computer-readable medium comprising instructions, which when executed by a processor in a server, operate to allow a first terminal to provide a content gift to a second terminal, wherein the first and second gift terminals selectively communicate with the server, the computer-readable medium comprising:
- instructions receiving a catalog request from the first terminal for a catalog that identifies content compatible with the second terminal;
- instructions for generating the catalog;
- instructions for transmitting the catalog to the first terminal;
- instructions for receiving a gift request from the first terminal requesting that a content gift selected from the catalog be provided to the second terminal;
- instructions for determining the content gift is content that is not already owned by the second terminal; and
- instructions for providing the content to the second terminal;
- wherein the instructions for generating comprise:
  - instructions for using a terminal identifier included in the catalog request to identify targeted content that is compatible with the second terminal; and
  - instructions for generating the catalog so that it identifies the targeted content.

60. A computer-readable medium comprising instructions, which when executed by a processor in a server, operate to allow a first terminal to provide a content gift to a second terminal, wherein the first and second gift terminals selectively communicate with the server, the computer-readable medium comprising:
- instructions for receiving a catalog request from the first terminal for a catalog that identifies content compatible with the second terminal;
- instructions for generating the catalog;
- instructions for transmitting the catalog to the first terminal;
- instructions for receiving a gift request from the first terminal requesting that a content gift selected from the catalog be provided to the second terminal;
- instructions for determining the content gift is already owned by the second terminal; and
- instructions for transmitting a notification message to the first terminal to indicate that content gift was not provided to the second terminal.

61. A method for operating a first terminal to provide a content gift to a second terminal, wherein the first and second terminals selectively communicate with each other over a data network, the method comprising:

transmitting a catalog request to the second terminal to obtain a catalog that identifies content compatible with the second terminal;
receiving the catalog;
selecting a content gift from the catalog;
determining the selected content gift is not already owned by the second terminal; and
transmitting a gift request to a gift server, wherein the gift server provides the content gift to the second terminal.

62. The method of claim 61, further comprising including security information in the catalog request so that the catalog request can be authenticated.

63. The method of claim 61, wherein the step of transmitting the catalog request comprises transmitting the catalog request using a wireless network connection.

64. The method of claim 61, wherein the step of transmitting the catalog request comprises transmitting the catalog request using a wired network connection.

65. The method of claim 61, wherein at least one of the first and second terminals is a wireless device.

66. The method of claim 61, further comprising transmitting the content from the first terminal to the second terminal.

* * * * *

UNITED STATES PATENT AND TRADEMARK OFFICE
CERTIFICATE OF CORRECTION

| | | |
|---|---|---|
| PATENT NO. | : 7,412,411 B2 | Page 1 of 1 |
| APPLICATION NO. | : 10/832717 | |
| DATED | : August 12, 2008 | |
| INVENTOR(S) | : Gerald Charles Horel, Brian Minear and Phil Tien Nguyen | |

It is certified that error appears in the above-identified patent and that said Letters Patent is hereby corrected as shown below:

On Title page, Item --(73) Assignee: QUALCOMM Incorporated, San Diego, CA (US)-- is missing.
    On Title page, Item --(74) Attorney, Agent, or Firm—Fariba Yadegar-Bandari; Robert J. O'Connell; Thomas R. Rouse-- is missing.

Signed and Sealed this

Twenty-seventh Day of April, 2010

David J. Kappos
*Director of the United States Patent and Trademark Office*